United States Patent
Nyborg

[15] 3,655,014
[45] Apr. 11, 1972

[54] AIRCRAFT WHEEL CHOCKS

[72] Inventor: Ralph Andrew Nyborg, 641 North Main Street, Naperville, Ill. 60540

[22] Filed: Mar. 16, 1970

[21] Appl. No.: 19,721

[52] U.S. Cl. ............................................................. 188/32
[51] Int. Cl. ......................................................... B60t 3/00
[58] Field of Search ............................................. 188/32, 36

[56] References Cited

UNITED STATES PATENTS

| | | | |
|---|---|---|---|
| 422,982 | 3/1890 | Shaffer | 188/32 |
| 2,240,512 | 5/1941 | Morgensen | 188/32 |
| 2,316,178 | 4/1943 | Morgensen | 188/32 |
| 2,829,738 | 4/1958 | Vasquez | 188/32 |
| 3,447,639 | 6/1969 | Parr | 188/32 |

FOREIGN PATENTS OR APPLICATIONS

| | | | |
|---|---|---|---|
| 947,541 | 1/1964 | Great Britain | 188/32 |

Primary Examiner—Duane A. Reger
Attorney—Frank J. Foley

[57] ABSTRACT

The wheel chock of this invention provides a shoe movably supported on a base from which it may be elevated for chocking contact with an aircraft wheel, and when it is retracted the entire body of the shoe moves away from the periphery of the wheel and simultaneously away from the area of tire contact with the ground, and meanwhile the base remains stationary.

6 Claims, 8 Drawing Figures

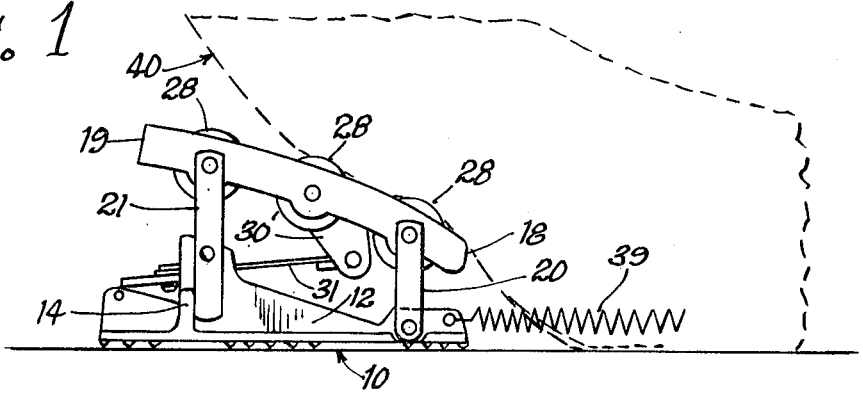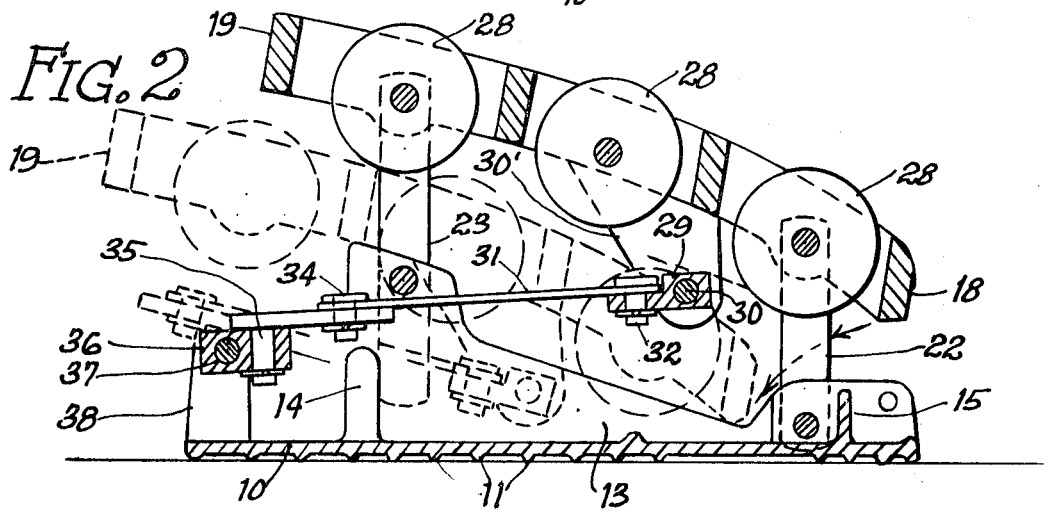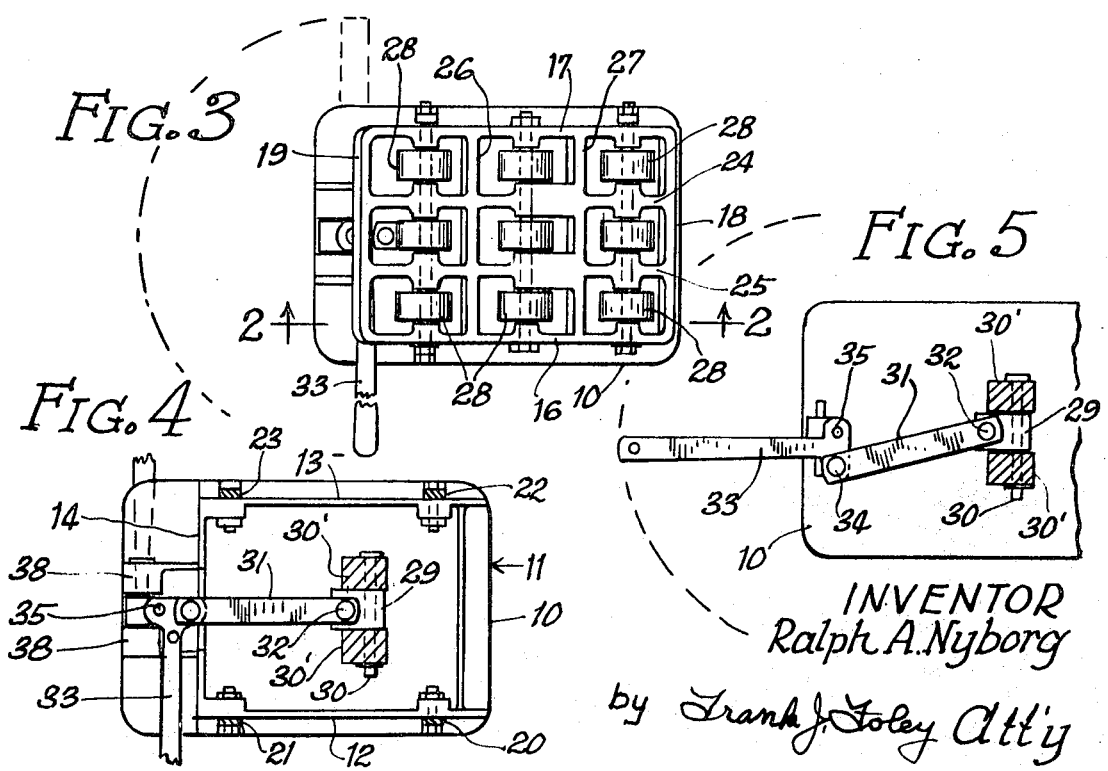

INVENTOR
Ralph A. Nyborg by Frank J. Foley att'y.

AIRCRAFT WHEEL CHOCKS

This invention relates to wheel chocks especially for aircraft wheels, but which may be used to chock other wheels. Its general objective is to provide a chock which can be disengaged quickly from an aircraft wheel with the expenditure of a small amount of manual effort. In contrast, the wheel chocks presently employed at air ports, and frequently of wedge or rectangular block shape, become so tightly gripped by the wheels during fueling and loading of the aircraft that it is often impossible to disengage them by manual effort alone, and other equipment and other power needs to be applied to the task. The pilot sometimes has to apply engine power and drive the wheels over the chocks. Problems of this kind are a matter of serious and daily occurence, and personal injuries frequently result therefrom.

One of the objects of this invention is to provide a wheel chock shoe which performs its chocking function while in a position elevated from its base, and the shoe is disengaged by retracting it from the wheel without moving the base.

Another object of the invention is to provide an aircraft wheel chock having a base for ground contact, and a chocking shoe separated from the base and movably supported thereon and capable of being elevated from the base and locked in chocking position.

Another object of the invention is to provide a wheel chock having a base and a chocking shoe separated from the base, the shoe having some chocking surfaces for chocking contact with a wheel tire which are movable relatively to other portions of the shoe and which are adapted to facilitate disengagement of the chock from the tire.

Another object of the invention is to provide wheel chocks, having the foregoing advantages, and made of non-magnetic material, so that the chocks may be assigned to a plane and always carried aboard the aircraft for use at other airports where similar chocks may be unavailable, and when so carried aboard will not interfere with the electronic apparatus of the aircraft during flight.

Other objects and advantages of the invention will be mentioned hereinafter, or will become apparent.

Referring to the form of the invention shown in FIGS. 1 to 5, inclusive,

FIG. 1 is a longitudinal vertical elevational view of the chock, showing how further loading of a plane, after original placement of the chock, causes a tire to effect a tighter grip on the chock.

FIG. 2 is a longitudinal vertical sectional view, approximately on line 2—2 of FIG. 3, showing the chock on a larger scale, the full lines showing the elevated position and the dotted lines showing the retracted position of the chock.

FIG. 4 is a plan view, partly in horizontal section, taken below the shoe.

FIG. 5 is a plan view showing in partially operated position a manually operable lever system for elevating and retracting the shoe.

Figure 6:
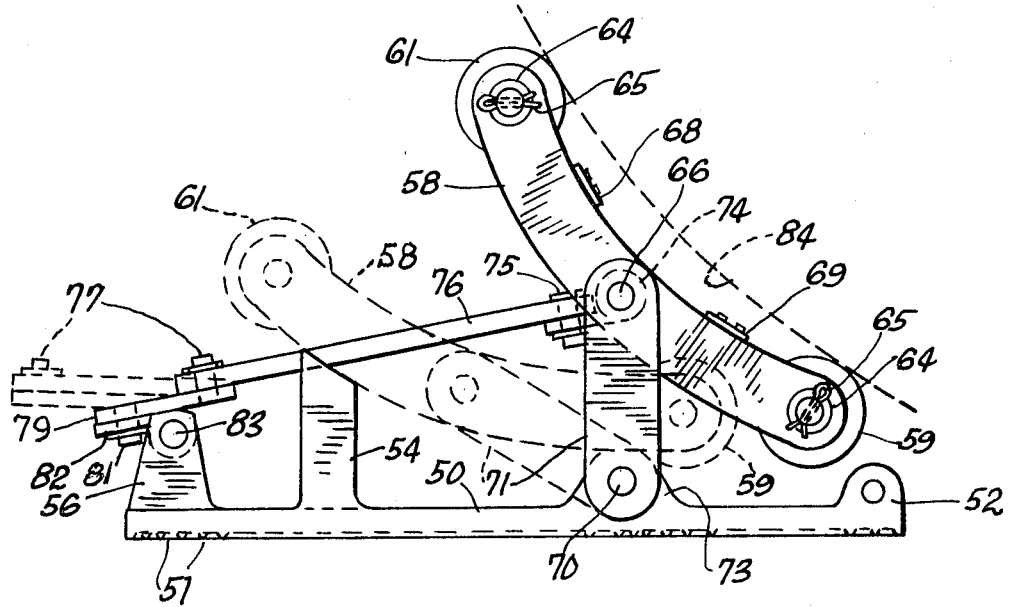
Figure 7:
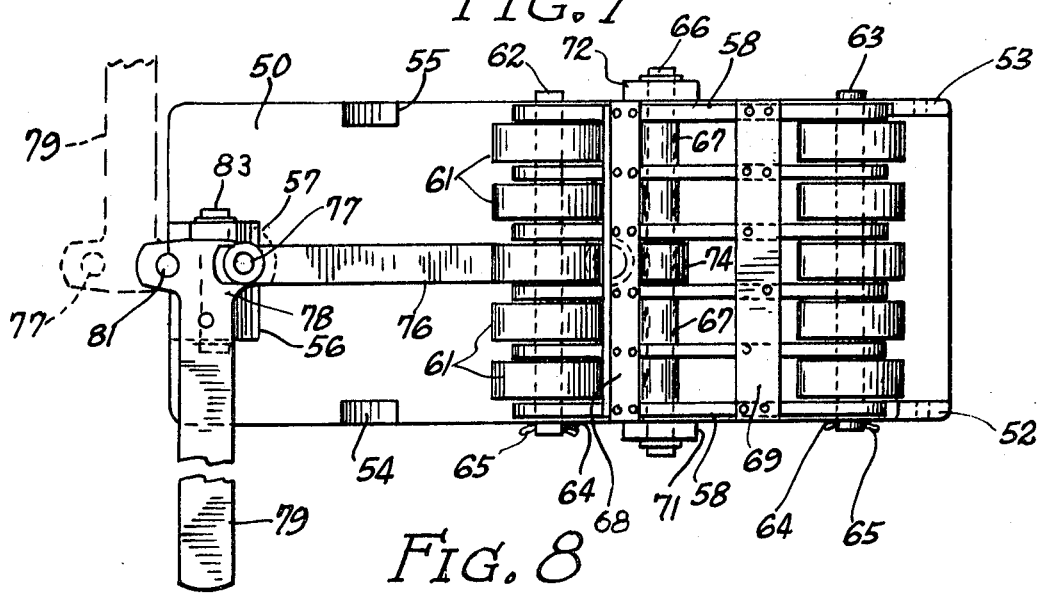
Figure 8:
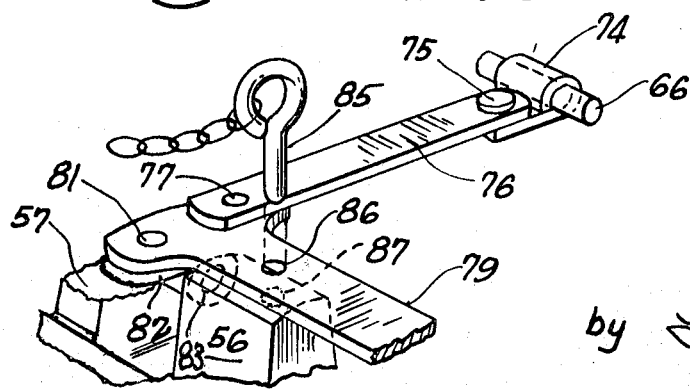

A modified form of the invention is shown in FIGS. 6 to 8.

FIG. 6 is a side elevational view, showing, in full lines, a chock shoe in tire contacting position, and retracted, in dotted lines.

FIG. 7 is a top plan view of the chock shoe.

FIG. 8 is a perspective view of a lever system, for use with either form of shoe, for elevating, locking, or retracting it.

The base of the device of FIG. 2 includes a flat and rigid plate 10, having on its bottom surface sharp projections 11 for gripping the airport surface. Rising from the plate are integral side flanges 12 and 13, and front and rear flanges 14 and 15.

The movable shoe includes side members 16 and 17, and end members 18 and 19, and it is supported on and pivotally connected to the base flanges 12 and 13 by links 20, 21, 22 and 23 and by suitable pivot pins or bolts. Within the boundaries of the side and end frame members of the shoe are additional reinforcing ribs such as 24 and 25, extending longitudinally of the base, the ribs 26 and 27, extending transversely thereof.

Supported within this network of ribs and frame members are pivotally mounted rollers such as 28, whose upper peripheral surfaces rise a substantial distance, as desired, above the general top surface of the shoe.

For raising and lowering the shoe, a linkage or lever system, which may be manually operable, is provided. It includes a bearing member 29 pivotally supported on a horizontal pin 30 fixed in a pair of projections 30' depending from the shoe assembly, and a link 31 pivotally connected to member 29. A bell crank 33 is loosely pivoted at 34 to the link 31 and itself is pivotally supported at 35 upon the base by means of a bearing element 36, which is free to rock on a pin 37 fixed in any suitable manner between posts 38 rising from the front portion of the base.

As may be seen in FIGS. 2, 4 and 5, manual rotation of the crank 33 through 180° will cause the shoe to be lowered and fully retracted, or, reversely, to be raised and moved forwardly.

In the normal use of these wheel chocks, they may be used singly or in pairs, one fore and one aft of a wheel and connected together on opposite sides of the wheel by springs, such as 39, seen in FIG. 1. When the shoes are fully elevated by the bell crank, it attains a dead center alignment of its linkage, which will lock the shoes in chocking position. However, conventional locking latches or pins may be added, if desired. The chocks, when elevated, may be pushed into snug contact with the tire.

Later, even though normal or abnormal further loading of the plane with fuel, passengers, mail, freight, baggage etc. occurs, and the wheels assume a tight grip on the chock or chocks, operation of the bell crank lever will readily and easily retract the shoe from the grip of the tire.

As may be seen in FIG. 2, the lower ends of the shoe supporting links, such as 21 and 23, may be designed to rotate into abutment with the front flange 14 at the front portion of the base, thus limiting the rotation of the links as the lever system moves into dead center alignment.

During retraction of a shoe, the rollers 28, wherever engaged by the tire, will rotate or be rotated by the periphery 40 of the tire, thus facilitating disengagement of the shoe from the tire, but before disengagement such rollers as are in contact with the tire share part of the chocking burden.

Normally most of the pressure exerted by the tire on the shoe is in a downward direction, having little tendency to cause the chock to skid away from the tire.

The general top surface of the shoe is convex, relatively to the circular periphery 40 of the tire. Hence, tires of different diameters will make a tangential contact with higher and higher areas on the shoe as the wheel diameters increase, and this contributes to quick and easy disengagement and relatively short travel of the shoe to effect disengagement.

Preferably the entire chock material is to be non-magnetic to avoid interference with electronic apparatus on the aircraft when the chock is carried in flight. A suitable non-magnetic metal or a plastic could be used.

Referring now to the modification shown in FIGS. 6, 7 and 8, the base plate 50 is preferably provided with sharp non-skid bottom projections 51, and with a pair of perforated ears 52 and 53 with which springs such as spring 39 of FIG. 1, may be engaged and for the same purpose.

Upwardly extending saddle posts may also be provided for receiving at rest the shoe when it is retracted, as is shown in FIG. 6. Another pair of posts 56 and 57 are disposed on the base for supporting part of the lever system employed for elevating and retracting the shoe.

The shoe includes longitudinally extending curved parallel bars such as 58 and a transverse row of rollers such as the front rollers 59 and a row of rear rollers 61, rotatably mounted on transverse rods 62 and 63 secured in place by means of washers 64 and pins 65, or other suitable means. Another rod 66 carrying short spacer sleeves 67 holds the assembly of bars and rollers together. Other means such as plates 68 and 69 may be screwed or bolted to the bars 58 to add to the rigidity of the shoe assembly.

The shoe assembly is centrally and pivotally supported on the base plate by means of hinge plates 71 and 72 pivoted on rod 66 and pivoted on the base at 70 on ear 73 on one side and similarly pivoted on the opposite side of the base.

The manually operable lever mechanism for raising and retracting the shoe includes a bracket 74 pivoted on rod 66 and itself pivotally connected by pin 75 to a link 76 which is pivotally connected by pin 77 to to a short arm 78 of a bell crank lever 79. The bell crank is pivotally connected by pin 81 to a rockable bracket 82, rockable on a pin 83 whose opposite ends are fixed in the posts 56 and 57.

This lever mechanism permits 180° rotation of the handle 79, during which the shoe may be retracted from the full line position of FIG. 6, where the shoe contacts the tire, to the dotted line position at which the rear end of the shoe rests on the saddle posts 54 and 55. Reverse rotation of the handle 79 will raise and advance the shoe until it is in contact with a tire or is in position to be presented for such contact.

When the bell crank is moved to the dead center locking position shown in FIGS. 6, 7 and 8, the shoe is sufficiently locked against accidental retraction when the shoe is in a pressure contact with a tire. However, if additional assurance be advisable, the pin 85 may be inserted through the hole 86 in the lever 79 and thence into hole 87 in post 56.

When the lever system is operated to present the shoe of FIG. 6 to a tire, the shoe, being capable of freely rocking about its median pivot 66 will automatically adjust to whatever diameter the tire has, and apply chocking pressure or opposition equally along the peripheries of the front rollers 59 and the rear rollers 61.

Subsequently, during retraction of either shoe, its entire bodily withdrawal not only away from the periphery of the tire but also away from the contact area of the tire with the ground and the friction-reducing action of its rollers assures that disengagement will be both easy and certain.

The actual amount of retraction, in terms of inches, obtainable with either wheel chock shown and described herein is not to be estimated by or limited to the relative dimensions of the drawings, but rather depends upon the relative sizes and proportions of the various parts when designed for application to wheels of known diameters.

Furthermore, it should be understood that this invention is susceptible of considerable modification and variation without departing from the spirit and scope of the invention as described herein.

Having shown and described my invention, I claim:

1. A wheel chock comprising a base for ground contact, a tire chocking shoe,
   shoe support means pivotally connected to the base and extending upwardly therefrom,
   additional pivotal connection means only between said support means and the shoe, whereby the shoe is wholly shiftable relatively to the base and may be supported in tire chocking in an elevated position above the base,
   and chock releasing means operable to retract the shoe from chocking position and shiftably lower the shoe toward the base.

2. A wheel chock comprising a base for ground contact, a tire chocking shoe,
   rotatable means carried by the shoe for chocking contact with a tire at areas circumferentially spaced apart relatively to the tire circumference,
   shoe support means having vertically spaced apart pivotal connections with the base and with the shoe adapted to allow operative movement of the shoe to and from chocking position and simultaneously to be wholly shiftable relatively to the base,
   and chock releasing means operable to retract the shoe from chocking position and shiftably lower the shoe toward the base.

3. A wheel chock in accordance with claim 1, in which the shoe has some surfaces for chocking contact with a tire which are movable relatively to other portions of the shoe during withdrawal of the shoe from a tire to faciitate disengagement of the shoe.

4. A wheel chock in accordance with claim 1, in which the pivotal support of the shoe on the base permits the shoe to rock relatively to the base when being brought into engagement with the periphery of a tire.

5. A wheel chock in accordance with claim 1, in which the top surface of the shoe when in chocking position is convex relatively to the circular periphery of the wheel tire.

6. A wheel chock in accordance with claim 2, in which the shoe provides two parallel rotary members extending transversely of the shoe and spaced apart longitudinally of the shoe for chocking contact with a wheel tire.

* * * * *